United States Patent
Kawahara et al.

(10) Patent No.: US 12,281,185 B2
(45) Date of Patent: Apr. 22, 2025

(54) ANIONIC POLYMERIZATION PROCESS AND POLYMER PRODUCTION METHOD

(71) Applicant: KURARAY CO., LTD., Kurashiki (JP)

(72) Inventors: Moe Kawahara, Tsukuba (JP); Tomohiro Ono, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 1040 days.

(21) Appl. No.: 17/271,431

(22) PCT Filed: Aug. 22, 2019

(86) PCT No.: PCT/JP2019/032762
§ 371 (c)(1),
(2) Date: Feb. 25, 2021

(87) PCT Pub. No.: WO2020/045212
PCT Pub. Date: Mar. 5, 2020

(65) Prior Publication Data
US 2021/0332163 A1 Oct. 28, 2021

(30) Foreign Application Priority Data
Aug. 27, 2018 (JP) .................... 2018-158446

(51) Int. Cl.
| | |
|---|---|
| C08F 2/26 | (2006.01) |
| C08F 4/12 | (2006.01) |
| C08F 220/14 | (2006.01) |
| C08F 220/18 | (2006.01) |
| C08F 297/02 | (2006.01) |
| C08K 5/17 | (2006.01) |
| C08K 5/56 | (2006.01) |

(52) U.S. Cl.
CPC ............... *C08F 2/26* (2013.01); *C08F 4/12* (2013.01); *C08F 220/14* (2013.01); *C08F 220/1804* (2020.02); *C08F 297/026* (2013.01); *C08K 5/17* (2013.01); *C08K 5/56* (2013.01); *C08F 2438/00* (2013.01)

(58) Field of Classification Search
None
See application file for complete search history.

(56) References Cited

U.S. PATENT DOCUMENTS

| | | |
|---|---|---|
| 5,656,704 A | 8/1997 | Wang et al. |
| 5,670,592 A | 9/1997 | Teyssie et al. |
| 6,329,480 B1 | 12/2001 | Uchiumi et al. |
| 6,555,637 B1 | 4/2003 | Hamada et al. |
| 6,630,554 B1 | 10/2003 | Hamada et al. |
| 6,767,976 B2 | 7/2004 | Hamada et al. |
| 6,894,114 B2 | 5/2005 | Kato et al. |
| 8,119,749 B2 | 2/2012 | Hamada et al. |
| 9,051,398 B2 | 6/2015 | Tanabe et al. |
| 9,796,890 B2 | 10/2017 | Kawasaki et al. |
| 9,988,477 B2 | 6/2018 | Shimizu et al. |
| 2003/0134998 A1* | 7/2003 | Hamada ............... C08F 4/48 526/186 |
| 2004/0034183 A1 | 2/2004 | Kato et al. |
| 2009/0118450 A1 | 5/2009 | Hamada et al. |
| 2015/0038658 A1 | 2/2015 | Tanabe et al. |
| 2016/0002378 A1 | 1/2016 | Shimizu et al. |
| 2016/0208149 A1 | 7/2016 | Kawasaki et al. |

FOREIGN PATENT DOCUMENTS

| | | |
|---|---|---|
| CN | 1466602 A | 1/2004 |
| CN | 101238155 A | 8/2008 |
| CN | 104204005 A | 12/2014 |
| CN | 105051083 A | 11/2015 |
| CN | 105492474 A | 4/2016 |
| EP | 0 945 470 B1 | 10/2004 |
| EP | 1 078 942 B1 | 6/2006 |
| JP | 7-330819 A | 12/1995 |
| JP | 11-335432 A | 12/1999 |
| JP | 2000-44631 A | 2/2000 |
| JP | 2001-131216 A | 5/2001 |
| JP | 2001-158805 A | 6/2001 |

(Continued)

OTHER PUBLICATIONS

Extended European Search Report issued Apr. 28, 2022, in corresponding European Patent Application No. 19854625.1, 10 pages.
Combined Chinese Office Action and Search Report issued Mar. 31, 2022, in corresponding Chinese Patent Application No. 201980054615.3 (with English Translation of Category of Cited Documents), 12 pages.
Skowrońska-Ptasińska, et al., "Phenoxyaluminium Compounds VII *. Reactions of Organoaluminium Compounds with Hindered Phenols", Journal of Organometallic Chemistry, 1978, vol. 160, pp. 403-409.

(Continued)

*Primary Examiner* — Eli D. Strah
(74) *Attorney, Agent, or Firm* — Oblon, McClelland, Maier & Neustadt, L.L.P.

(57) ABSTRACT

A process for anionically polymerizing a (meth)acrylic acid in the presence of a tertiary organoaluminum compound (A), an organolithium compound (B) and at least one kind of a Lewis base (C) in a polymerization system. The tertiary organoaluminum compound (A) includes a tertiary organoaluminum compound (A1) having a chemical structure in which at least two of three unshared electrons of an aluminum atom are bonded to an aromatic ring via an oxygen atom, and the tertiary organoaluminum compound (A) has a molar ratio (A2)/(A1) in the range of 0% or above and 0.8% or below between a tertiary organoaluminum compound (A2) having a chemical structure in which at most one of three unshared electrons of an aluminum atom is bonded to an aromatic ring via an oxygen atom, and the tertiary organoaluminum compound (A1).

20 Claims, No Drawings

(56) References Cited

FOREIGN PATENT DOCUMENTS

| JP | 2002-88109 A | 3/2002 |
| JP | 2009-79095 A | 4/2009 |
| WO | 2015/012229 A1 | 1/2015 |

OTHER PUBLICATIONS

Qian, et al. "Studies on the Tacticity of Poly (methyl methacrylate) Synthesized by Atom Transfer Radical Polymerization", Chemical Journal of Chinese Universities, 2000, vol. 21, No. 11, 1762-1765, with English abstract.

International Search Report and the Written Opinion issued Oct. 15, 2019 in PCT/JP2019/032762, 15 pages.

Antonio Rodriguez-Delgado, et al., "Single-Site Anionic Polymerization. Monomeric Ester Enolaluminate Propagator Synthesis, Molecular Structure, and Polymerization Mechanism", Journal of the American Chemical Society, 2005, vol. 127, pp. 961-974.

\* cited by examiner

ANIONIC POLYMERIZATION PROCESS AND POLYMER PRODUCTION METHOD

CROSS-REFERENCE TO RELATED APPLICATIONS

The present application is the national stage of international application PCT/JP2019/032762, filed on Aug. 22, 2019, and claims the benefit of the filing date of Japanese Appl. No. 2018-158446, filed on Aug. 27, 2018.

TECHNICAL FIELD

The present invention relates to a process for anionically polymerizing an anionically polymerizable monomer and to a method for producing a polymer by the polymerization process.

BACKGROUND ART

Numerous studies have been made on processes for anionically polymerizing polar monomers such as methacrylic acid esters and acrylic acid esters. These polar monomers have sites such as carbonyl groups that are susceptible to nucleophilic attack. Thus, unfortunately, the anionic polymerization is accompanied by side reactions of monomers and by intramolecular cyclization reactions (so-called backbiting) at growth ends. Due to this fact, it is relatively difficult to obtain high living properties. To attain high living properties, the conventional anionic polymerization process often entails the use of polymerization initiators whose synthesis and purification are complicated. Further, it is often the case that the temperature during anionic polymerization should be as extremely low as about −60° C. The consequent increase in cooling cost is a factor that makes the process disadvantageous to industrial production.

The present applicant has proposed an approach capable of solving the above problem (see, for example, Patent Literature 1). Specifically, an anionically polymerizable monomer is polymerized using an anionic polymerization initiator in a polymerization system containing a combination of a specific organoaluminum compound and a specific Lewis base.

As compared with the conventional anionic polymerization processes, the above anionic polymerization process can achieve high polymerization initiation efficiency, high polymerization rate and high living properties. Further, the polymerization process is superior in that it can produce polymers having a narrow molecular weight distribution and block copolymers having high blocking efficiency in an industrially advantageous manner.

CITATION LIST

Patent Literature

Patent Literature 1: JP-A-2001-131216

SUMMARY OF INVENTION

Technical Problem

In the production of a (meth)acrylic acid ester polymer by the process described in the above patent literature, however, a gel probably stemming from the organoaluminum compound is generated and sometimes adversely affects properties (for example, transparency) of the (meth)acrylic acid ester polymer obtained. The gelation is sometimes significant and lowers the polymerization initiation efficiency or living properties. Further, a block copolymer that is produced sometimes has nonuniform molecular weights.

An object of the present invention is to provide a more reliable process for anionically polymerizing a (meth)acrylic acid ester that attains high polymerization initiation efficiency and high living properties without impairing the inherent characteristics of (meth)acrylic polymers such as transparency. Another object of the present invention is to provide a more reliable method for producing a (meth)acrylic acid ester block copolymer having a highly uniform molecular weight.

Solution to Problem

After extensive studies directed to achieving the above objects, the present inventors have found that a (meth)acrylic acid ester may be anionically polymerized without suffering deterioration in inherent characteristics of (meth)acrylic polymers while still ensuring that high living properties will be obtained more reliably during the anionic polymerization and that a block copolymer will be produced more reliably with high uniformity in molecular weight by performing the anionic polymerization in the presence of a tertiary organoaluminum compound comprising a specific proportion of a tertiary organoaluminum compound with a specific chemical structure, an organolithium compound, and at least one kind of a Lewis base.

According to the present invention, the objects described hereinabove are achieved by providing items including the following [1] to [9].

[1] An anionic polymerization process for anionically polymerizing a (meth)acrylic acid ester in the presence of a tertiary organoaluminum compound (A), an organolithium compound (B) and at least one kind of a Lewis base (C) in a polymerization system, wherein the tertiary organoaluminum compound (A) comprises a tertiary organoaluminum compound (A1) having a chemical structure in which at least two of three unshared electrons of an aluminum atom are bonded to an aromatic ring via an oxygen atom, and the tertiary organoaluminum compound (A) has a molar ratio (A2)/(A1) in the range of 0% or above and 0.8% or below between a tertiary organoaluminum compound (A2) having a chemical structure in which at most one of three unshared electrons of an aluminum atom is bonded to an aromatic ring via an oxygen atom, and the tertiary organoaluminum compound (A1).

[2] The anionic polymerization process described in [1], wherein the molar ratio (A2)/(A1) of the tertiary organoaluminum compound (A2) to the tertiary organoaluminum compound (A1) is in the range of more than 0% and not more than 0.8%.

[3] The anionic polymerization process described in [1] or [2], wherein the Lewis base (C) comprises a tertiary polyamine compound (C1).

[4] The anionic polymerization process described in [3], wherein the tertiary polyamine compound (C1) comprises at least one selected from N,N,N',N'-tetramethylethylenediamine, N,N,N',N'',N''-pentamethyldiethylenetriamine, and 1,1,4,7,10,10-hexamethyltriethylenetetramine.

[5] The anionic polymerization process described in [1] or [2], wherein the Lewis base (C) comprises an ether compound (C2).

[6] The anionic polymerization process described in [5], wherein the ether compound (C2) comprises an acyclic ether compound (C2-1) having one or more ether bonds in the molecule or a cyclic ether compound (C2-2) having two or more ether bonds in the molecule.

[7] The anionic polymerization process described in any of [1] to [6], wherein the tertiary organoaluminum compound (A1) is isobutylbis(2,6-di-t-butyl-4-methylphenoxy) aluminum. [8] A method for producing a polymer comprising polymerizing a (meth)acrylic acid ester by the anionic polymerization process described in any of [1] to [7].

[9] A method for producing a block copolymer comprising polymerizing two or more kinds of (meth)acrylic acid esters by the anionic polymerization process described in any of [1] to [7].

Advantageous Effects of Invention

According to the present invention, the occurrence of gels can be suppressed to allow a (meth)acrylic acid ester to be anionically polymerized more reliably without suffering deterioration in inherent characteristics of (meth)acrylic polymers such as transparency. Further, anionic polymerization can be performed with high living properties to give a polymer with a narrow molecular weight distribution and to produce more reliably a (meth)acrylic acid ester block polymer having a highly uniform molecular weight.

DESCRIPTION OF EMBODIMENTS

The present invention will be described in detail hereinbelow. In the present specification, "(meth)acrylic acid ester" is a general term for "methacrylic acid ester" and "acrylic acid ester", "(meth)acrylic" is a general term for "methacrylic" and "acrylic", and "(meth)acryloyl" is a general term for "methacryloyl" and "acryloyl".

In the present invention, a polymer is produced by polymerizing a (meth)acrylic acid ester by an anionic polymerization process. The (meth)acrylic acid esters that are anionically polymerized in the present invention are not particularly limited as long as having anionic polymerizability.

Examples of the methacrylic acid esters include monofunctional methacrylic acid esters such as methyl methacrylate, ethyl methacrylate, propyl methacrylate, isopropyl methacrylate, allyl methacrylate, n-butyl methacrylate, t-butyl methacrylate, cyclohexyl methacrylate, benzyl methacrylate, 2-ethylhexyl methacrylate, lauryl methacrylate, glycidyl methacrylate, trimethoxysilylpropyl methacrylate, methoxyethyl methacrylate, N,N-dimethylaminoethyl methacrylate and N,N-diethylaminoethyl methacrylate.

Examples of the acrylic acid esters include monofunctional acrylic acid esters such as methyl acrylate, ethyl acrylate, propyl acrylate, isopropyl acrylate, allyl acrylate, n-butyl acrylate, t-butyl acrylate, cyclohexyl acrylate, benzyl acrylate, 2-ethylhexyl acrylate, lauryl acrylate, glycidyl acrylate, trimethoxysilylpropyl acrylate, methoxyethyl acrylate, N,N-dimethylaminoethyl acrylate and N,N-diethylaminoethyl acrylate.

The (meth)acrylic acid esters may be used singly, or two or more may be used in combination. The monofunctional (meth)acrylic acid esters described above may be used in combination with other anionically polymerizable monomers.

Examples of such additional anionically polymerizable monomers other than the monofunctional (meth)acrylic acid esters include polyfunctional (meth)acrylic acid esters having two or more (meth)acryloyl groups.

A block copolymer having a plurality of polymer blocks may be produced by anionically polymerizing a combination of two or more kinds of (meth)acrylic acid esters, typically, by sequentially polymerizing (meth)acrylic acid esters corresponding to respective polymer blocks.

To ensure that the polymerization reaction will take place smoothly, it is preferable that the (meth)acrylic acid esters and other anionically polymerizable monomers which are used as required be sufficiently dried beforehand by, for example, being treated under a stream of an inert gas such as nitrogen gas. The drying treatment may be performed with, for example, a dehydrating/drying agent such as calcium hydride, molecular sieve or active alumina.

An organolithium compound (B) is used in the anionic polymerization of (meth)acrylic acid esters. The organolithium compound (B) is preferably an organolithium compound which contains one or more carbon atoms serving as anionic centers in the molecule, and has lithium cations as counterion centers pairing with the anionic centers, namely, as many as the anionic centers. Depending on the carbon atoms as the anionic centers, the organolithium compounds (B) are classified into three types: organolithium compounds (B1) having a chemical structure in which the anionic center is a tertiary carbon atom, organolithium compounds (B2) having a chemical structure in which the anionic center is a secondary carbon atom, and organolithium compounds (B3) having a chemical structure in which the anionic center is a primary carbon atom.

Examples of the organolithium compounds (B1) having a chemical structure in which the anionic center is a tertiary carbon atom include t-alkyllithiums such as t-butyllithium and 1,1-dimethylpropyllithium; 1,1-diarylalkyllithiums such as 1,1-diphenylhexyllithium and 1,1-diphenyl-3-methylpentyllithium; and $\alpha,\alpha$-dialkyl-$\alpha$-lithioacetic acid esters such as ethyl $\alpha$-lithioisobutyrate, butyl $\alpha$-lithioisobutyrate and methyl $\alpha$-lithioisobutyrate.

Examples of the organolithium compounds (B2) having a chemical structure in which the anionic center is a secondary carbon atom include sec-alkyllithiums such as isopropyllithium, 1-methylpropyllithium (sec-butyllithium), 1-methylbutyllithium, 2-ethylpropyllithium and 1-methylpentyllithium; cycloalkyllithiums such as cyclohexyllithium; diarylmethyllithiums such as diphenylmethyllithium; and 1-alkyl-1-arylmethyllithiums such as $\alpha$-methylbenzyllithium.

Examples of the organolithium compounds (B3) having a chemical structure in which the anionic center is a primary carbon atom include n-alkyllithiums such as methyllithium, propyllithium, n-butyllithium and pentyllithium.

Among the organolithium compounds (B), the organolithium compounds (B2) having a chemical structure in which the anionic center is a secondary carbon atom are preferable because they concurrently satisfy high levels of convenience in industrial use (such as low risk of ignition, easy handling and easy production) and polymerization initiation performance. For the same reason, lithium salts of C3-C40 hydrocarbons having a chemical structure in which the anionic center is a secondary carbon atom are more preferable, and 1-methylpropyllithium (sec-butyllithium) is particularly preferable.

The organolithium compounds (B) may be used singly, or two or more may be used in combination. The amount of the organolithium compound (B) may be determined appropriately in accordance with factors such as the types of monomers used, and molecular weight. For reasons such as because a target polymer can be produced smoothly, the amount is preferably 0.01 to 10 mol per 100 mol of the total of a (meth)acrylic acid ester and any other anionically polymerizable monomers.

In the anionic polymerization process of the present invention, it is important that a specific tertiary organoaluminum compound (A) and at least one kind of a Lewis base (C) be present in the polymerization system.

The tertiary organoaluminum compound (A) comprises a tertiary organoaluminum compound (A1) having a chemical structure in which at least two of the three unshared electrons of an aluminum atom are bonded to an aromatic ring via an oxygen atom. The tertiary organoaluminum compound (A1) present as the tertiary organoaluminum compound (A) offers enhanced living properties and allows a block copolymer to be produced with enhanced uniformity in molecular weight.

Examples of the tertiary organoaluminum compounds (A1) include those tertiary organoaluminum compounds represented by the following general formula (I):

$$AlR^1R^2R^3 \quad (I)$$

In the above formula (I), $R^1$ is an optionally substituted monovalent saturated hydrocarbon group, an optionally substituted monovalent aromatic hydrocarbon group, an optionally substituted alkoxy group, an optionally substituted aryloxy group, or an optionally substituted N,N-disubstituted amino group, and $R^2$ and $R^3$ are each independently an optionally substituted aryloxy group, or $R^2$ and $R^3$ are bonded to each other to form an optionally substituted arylenedioxy group.

Examples of the optionally substituted monovalent saturated hydrocarbon groups which may be represented by $R^1$ include alkyl groups such as methyl group, ethyl group, n-propyl group, isopropyl group, n-butyl group, isobutyl group, sec-butyl group, t-butyl group, 2-methylbutyl group, 3-methylbutyl group, n-octyl group and 2-ethylhexyl group; and cycloalkyl groups such as cyclohexyl group.

Examples of the optionally substituted monovalent aromatic hydrocarbon groups which may be represented by $R^1$ include aryl groups such as phenyl group; and aralkyl groups such as benzyl group.

Examples of the optionally substituted alkoxy groups which may be represented by $R^1$ include methoxy group, ethoxy group, isopropoxy group and t-butoxy group.

Examples of the optionally substituted N,N-disubstituted amino groups which may be represented by $R^1$ include dialkylamino groups such as dimethylamino group, diethylamino group and diisopropylamino group; and bis(trimethylsilyl)amino group.

These monovalent saturated hydrocarbon groups, monovalent aromatic hydrocarbon groups, alkoxy groups and N,N-disubstituted amino groups may be each substituted with one or more substituents such as, for example, alkoxy groups such as methoxy group, ethoxy group, isopropoxy group and t-butoxy group; and halogen atoms such as chlorine and bromine.

Examples of the optionally substituted aryloxy groups which may be represented by $R^1$, $R^2$ and $R^3$ include unsubstituted aryloxy groups such as phenoxy group, 2-methylphenoxy group, 4-methylphenoxy group, 2,6-dimethylphenoxy group, 2,4-di-t-butylphenoxy group, 2,6-di-t-butylphenoxy group, 2,6-di-t-butyl-4-methylphenoxy group, 2,6-di-t-butyl-4-ethylphenoxy group, 2,6-diphenylphenoxy group, 1-naphthoxy group, 2-naphthoxy group, 9-phenanthryloxy group and 1-pyrenyloxy group; and substituted aryloxy groups such as 7-methoxy-2-naphthoxy group.

Examples of the optionally substituted arylenedioxy groups represented by $R^2$ and $R^3$ bonded to each other include groups resulting from the removal of hydrogen atoms from two phenolic hydroxyl groups in, for example, 2,2'-biphenol, 2,2'-methylenebisphenol, 2,2'-methylenebis(4-methyl-6-t-butylphenol), (R)-(+)-1,1'-bi-2-naphthol and (S)-(−)-1,1'-bi-2-naphthol.

The optionally substituted aryloxy groups and the optionally substituted arylenedioxy groups described above may be each substituted with one or more substituents such as, for example, alkoxy groups such as methoxy group, ethoxy group, isopropoxy group and t-butoxy group; and halogen atoms such as chlorine and bromine.

$R^1$, $R^2$ and $R^3$ in the general formula (I) may have the same chemical structures as one another or may have different chemical structures from one another as long as their chemical structures satisfy the above definitions.

Examples of the tertiary organoaluminum compounds (A1) described above include ethylbis(2,6-di-t-butyl-4-methylphenoxy)aluminum, ethylbis(2,6-di-t-butylphenoxy)aluminum, ethyl[2,2'-methylenebis(4-methyl-6-t-butylphenoxy)]aluminum, isobutylbis(2,6-di-t-butyl-4-methylphenoxy)aluminum, isobutylbis(2,6-di-t-butylphenoxy)aluminum, isobutyl[2,2'-methylenebis(4-methyl-6-t-butylphenoxy)]aluminum, n-octylbis(2,6-di-t-butyl-4-methylphenoxy)aluminum, n-octylbis(2,6-di-t-butylphenoxy)aluminum, n-octyl[2,2'-methylenebis(4-methyl-6-t-butylphenoxy)]aluminum, methoxybis(2,6-di-t-butyl-4-methylphenoxy)aluminum, methoxybis(2,6-di-t-butylphenoxy)aluminum, methoxy[2,2'-methylenebis(4-methyl-6-t-butylphenoxy)]aluminum, ethoxybis(2,6-di-t-butyl-4-methylphenoxy)aluminum, ethoxybis(2,6-di-t-butylphenoxy)aluminum, ethoxy[2,2'-methylenebis(4-methyl-6-t-butylphenoxy)]aluminum, isopropoxybis(2,6-di-t-butyl-4-methylphenoxy)aluminum, isopropoxybis(2,6-di-t-butylphenoxy)aluminum, isopropoxy[2,2'-methylenebis(4-methyl-6-t-butylphenoxy)]aluminum, t-butoxybis(2,6-di-t-butyl-4-methylphenoxy)aluminum, t-butoxybis(2,6-di-t-butylphenoxy)aluminum, t-butoxy[2,2'-methylenebis(4-methyl-6-t-butylphenoxy)]aluminum, tris(2,6-di-t-butyl-4-methylphenoxy)aluminum, and tris(2,6-diphenylphenoxy)aluminum.

Among these tertiary organoaluminum compounds (A1), isobutylbis(2,6-di-t-butyl-4-methylphenoxy)aluminum, isobutylbis(2,6-di-t-butylphenoxy)aluminum and isobutyl[2,2'-methylenebis(4-methyl-6-t-butylphenoxy)]aluminum are preferable for reasons such as high polymerization initiation efficiency, high living properties, high availability and easy handling. Isobutylbis(2,6-di-t-butyl-4-methylphenoxy)aluminum is more preferable.

The tertiary organoaluminum compounds (A1) may be produced by any methods without limitation and may be prepared, for example, in accordance with a known technique. The tertiary organoaluminum compounds (A1) may be used singly, or two or more may be used in combination.

The tertiary organoaluminum compound (A) may comprise a small amount of a tertiary organoaluminum compound (A2) having a chemical structure in which at most one of the three unshared electrons of an aluminum atom is bonded to an aromatic ring via an oxygen atom.

Examples of the tertiary organoaluminum compounds (A2) include those tertiary organoaluminum compounds represented by the following general formula (II):

$$AlR^4R^5R^6 \quad (II)$$

In the formula (II), $R^4$ is an optionally substituted aryloxy group, and $R^5$ and $R^6$ are each independently an optionally substituted monovalent saturated hydrocarbon group, an optionally substituted monovalent aromatic hydrocarbon group, an optionally substituted alkoxy group, or an optionally substituted N,N-disubstituted amino group.

Specific examples of the optionally substituted aryloxy groups which may be represented by $R^4$ are the same as those of the optionally substituted aryloxy groups which may be represented by $R^1$. The optionally substituted aryloxy groups may be each substituted with one or more substituents such as, for example, alkoxy groups such as methoxy group, ethoxy group, isopropoxy group and t-butoxy group; and halogen atoms such as chlorine and bromine.

Specific examples of the optionally substituted monovalent saturated hydrocarbon groups which may be represented by $R^5$ and $R^6$ are the same as those of the optionally substituted monovalent saturated hydrocarbon groups which may be represented by $R^1$. Specific examples of the optionally substituted monovalent aromatic hydrocarbon groups which may be represented by $R^5$ and $R^6$ are the same as those of the optionally substituted monovalent aromatic hydrocarbon groups which may be represented by $R^1$. Specific examples of the optionally substituted alkoxy groups which may be represented by $R^5$ and $R^6$ are the same as those of the optionally substituted alkoxy groups which may be represented by $R^1$. Specific examples of the N,N-disubstituted amino groups which may be represented by $R^5$ and $R^6$ are the same as those of the N,N-disubstituted amino groups which may be represented by $R^1$. These monovalent saturated hydrocarbon groups, monovalent aromatic hydrocarbon groups, alkoxy groups and N,N-disubstituted amino groups may be each substituted with one or more substituents such as, for example, alkoxy groups such as methoxy group, ethoxy group, isopropoxy group and t-butoxy group; and halogen atoms such as chlorine and bromine.

$R^5$ and $R^6$ in the general formula (II) may have the same chemical structures as each other or may have different chemical structures from each other as long as their chemical structures satisfy the above definitions.

Examples of the tertiary organoaluminum compounds (A2) described above include diethyl(2,6-di-t-butyl-4-methylphenoxy)aluminum, diethyl(2,6-di-t-butylphenoxy)aluminum, diisobutyl(2,6-di-t-butyl-4-methylphenoxy)aluminum, diisobutyl(2,6-di-t-butylphenoxy)aluminum, di-n-octyl(2,6-di-t-butyl-4-methylphenoxy)aluminum and di-n-octyl(2,6-di-t-butylphenoxy)aluminum.

The tertiary organoaluminum compounds (A2) may be produced by any methods without limitation and may be prepared, for example, in accordance with a known technique. The tertiary organoaluminum compounds (A2) may be used singly, or two or more may be used in combination.

In the tertiary organoaluminum compound (A), the molar ratio (A2)/(A1) of the tertiary organoaluminum compound (A2) to the tertiary organoaluminum compound (A1) is in the range of 0% or above and 0.8% or below. The (A2)/(A1) ratio in this range ensures that (meth)acrylic acid esters may be anionically polymerized while the occurrence of a gel stemming from the tertiary organoaluminum compound is suppressed, and thus inherent characteristics of (meth) acrylic polymers are not impaired. Further, the above ratio makes it possible to obtain more reliably high living properties during the anionic polymerization and to produce a block copolymer having a highly uniform molecular weight more reliably. To further enhance living properties during the anionic polymerization and to further increase the uniformity in molecular weight of a block copolymer that is produced, the molar ratio (A2)/(A1) may be, for example, 0% or above and 0.5% or below, preferably more than 0% and not more than 0.8%, more preferably more than 0% and not more than 0.5%, still more preferably not less than 0.001% and not more than 0.3%, and particularly preferably not less than 0.001% and not more than 0.1%. From the point of view of the productivity of the tertiary organoaluminum compound (A), the ratio may be 0.001% or above. When the molar ratio (A2)/(A1) is 0.001% or above, excellent solubility tends to be obtained and thus storage stability at low temperatures is enhanced.

The molar ratio (A2)/(A1) of the tertiary organoaluminum compound (A2) to the tertiary organoaluminum compound (A1) may be controlled by, for example, controlling the amount of synthesis time and the temperature during the synthesis of the tertiary organoaluminum compound (A).

The amount in which the tertiary organoaluminum compound (A) is used may be determined appropriately in accordance with factors such as the type of the polymerization operation, the type of a solvent constituting the polymerization system in the case of solution polymerization, and other various polymerization conditions. It is usually preferable that the amount of the tertiary organoaluminum compound (A) be in the range of 0.3 to 300 mol, more preferably in the range of 1 to 100 mol per mol of the organolithium compound (B).

The Lewis base (C) used together with the tertiary organoaluminum compound (A) is not particularly limited as long as the base is effective for the anionic polymerization of (meth)acrylic acid esters. The Lewis base (C) preferably comprises at least one kind of a Lewis base selected from the group consisting of tertiary polyamine compounds (C1) and ether compounds (C2).

The tertiary polyamine compounds (C1) that are used are not particularly limited as long as the compounds have two or more tertiary amine structures in the molecule and do not adversely affect the polymerization reaction. In the present invention, the "tertiary amine structure" means a partial chemical structure in which three carbon atoms are bonded to one nitrogen atom. The three carbon atoms bonded to the nitrogen atom may form part of an aromatic ring.

Examples of the tertiary polyamine compounds (C1) include linear polyamine compounds such as N,N,N',N'-tetramethylethylenediamine, N,N,N',N'-tetraethylethylenediamine, N,N,N',N'',N''-pentamethyldiethylenetriamine, 1,1,4,7,10,10-hexamethyltriethylenetetramine and tris[2-(dimethylamino)ethyl]amine; nonaromatic heterocyclic compounds such as 1,3,5-trimethylhexahydro-1,3,5-triazine, 1,4,7-trimethyl-1,4,7-triazacyclononane and 1,4,7,10,13,16-hexamethyl-1,4,7,10,13,16-hexaazacyclooctadecane; and aromatic heterocyclic compounds such as 2,2'-bipyridyl and 2,2':6',2''-terpyridine. Among the tertiary polyamine compounds (C1), linear polyamine compounds are preferable from the point of view of high polymerization initiation efficiency and also because high living properties can be maintained during the polymerization, and N,N,N',N'-tetramethylethylenediamine, N,N,N',N'',N''-pentamethyldiethylenetriamine and 1,1,4,7,10,10-hexamethyltriethylenetetramine are more preferable.

It is not preferable to use a tertiary monoamine compound such as triethylamine in place of the Lewis base (C) because such use causes a decrease in polymerization initiation efficiency and a decrease in living properties during the polymerization.

The tertiary polyamine compounds (C1) may be used singly, or two or more may be used in combination.

The ether compounds (C2) that are used may be any compounds without limitation as long as the compounds have an ether bond (—O—) in the molecule, do not contain metal components, and do not adversely affect the polymerization reaction. From points of view such as high polymerization initiation efficiency and high living properties during the polymerization, preferred ether compounds (C2) are acyclic ether compounds (C2-1) having one or more ether bonds in the molecule, and cyclic ether compounds (C2-2) having two or more ether bonds in the molecule.

Examples of the acyclic ether compounds (C2-1) having one or more ether bonds in the molecule include acyclic monoether compounds such as dimethyl ether, diethyl ether, diisopropyl ether, dibutyl ether and anisole; acyclic diether compounds such as 1,2-dimethoxyethane, 1,2-diethoxyethane, 1,2-diisopropoxyethane, 1,2-dibutoxyethane, 1,2-diphenoxyethane, 1,2-dimethoxypropane, 1,2-diethoxypropane, 1,2-diisopropoxypropane, 1,2-dibutoxypropane, 1,2-diphenoxypropane, 1,3-dimethoxypropane, 1,3-diethoxypropane, 1,3-diisopropoxypropane, 1,3-dibutoxypropane, 1,3-diphenoxypropane, 1,4-dimethoxybutane, 1,4-diethoxybutane, 1,4-diisopropoxybutane, 1,4-dibutoxybutane and 1,4-diphenoxybutane; acyclic triether compounds such as diethylene glycol dimethyl ether, dipropylene glycol dimethyl ether, dibutylene glycol dimethyl ether, diethylene glycol diethyl ether, dipropylene glycol diethyl ether and dibutylene glycol diethyl ether; and polyalkylene glycol dialkyl ethers such as triethylene glycol dimethyl ether, tripropylene glycol dimethyl ether, tributylene glycol dimethyl ether, triethylene glycol diethyl ether, tripropylene glycol diethyl ether, tributylene glycol diethyl ether, tetraethylene glycol dimethyl ether, tetrapropylene glycol dimethyl ether, tetrabutylene glycol dimethyl ether, tetraethylene glycol diethyl ether, tetrapropylene glycol diethyl ether and tetrabutylene glycol diethyl ether.

Examples of the cyclic ether compounds (C2-2) having two or more ether bonds in the molecule include crown ethers such as 12-crown-4, 15-crown-5, and 18-crown-6.

Among the ether compounds (C2), the acyclic ether compounds (C2-1) are preferable for reasons such as high availability and also because these compounds have little adverse effects on the tertiary organoaluminum compounds (A) and the advantageous effects of the present invention are markedly produced. Diethyl ether and 1,2-dimethoxyethane are more preferable.

When a cyclic ether compound having one ether bond in the molecule, for example, tetrahydrofuran or an epoxy compound such as propylene oxide, is used as the ether compound (C2), such an ether compound may too strongly interact with the tertiary organoaluminum compound (A) or may react directly with the organolithium compound (B) or the living polymer in the course of growth. It is therefore usually desirable to avoid the use of a cyclic ether compound having one ether bond in the molecule as the Lewis base (C).

The ether compounds (C2) may be used singly, or two or more may be used in combination.

Other Lewis bases (C) which may be used are compounds having one or more ether bonds and one tertiary amine structure in the molecule, and compounds having one or more ether bonds and two or more tertiary amine structures in the molecule. The compounds having one or more ether bonds and one tertiary amine structure in the molecule may be classified into the ether compounds (C2), and the compounds having one or more ether bonds and two or more tertiary amine structures in the molecule may be classified into the polyamine compounds (C1).

The Lewis bases (C) may be used singly, or two or more may be used in combination. Thus, use may be made of a mixture of the tertiary polyamine compound (C1) and the ether compound (C2).

The amount in which the Lewis base (C) is used may be determined appropriately in accordance with factors such as reaction conditions. From points of view such as high polymerization initiation efficiency and high living properties during the polymerization, the molar ratio of the Lewis base (C) to the organolithium compound (B) is preferably not less than 0.1, more preferably not less than 0.3, and still more preferably not less than 0.5.

While the Lewis base (C) may also be used as a solvent, it is generally preferable that the amount of the Lewis base (C) be limited to not more than 95 mass % of the total mass of the polymerization system in order to avoid a significant decrease in polymerization initiation efficiency.

The anionic polymerization process of the present invention may adopt any polymerization mode such as solution polymerization, bulk polymerization or precipitation polymerization. Solution polymerization in an organic solvent is preferable because, for example, the polymerization temperature can be controlled, and the conditions in the polymerization system can be equalized to allow the polymerization to proceed smoothly. The organic solvents are not particularly limited. For example, aromatic hydrocarbon solvents such as toluene, ethylbenzene and xylene; saturated hydrocarbon solvents such as hexane, cyclohexane and methylcyclohexane; halogenated hydrocarbon solvents such as chloroform, methylene chloride and carbon tetrachloride; and ester solvents such as dimethyl phthalate are generally preferably used because, for example, these solvents can be handled relatively safely, will not find their way into waste water, and can be easily recovered for purification. The organic solvents may be used singly, or two or more may be used in combination.

When an organic solvent is used in the anionic polymerization process of the present invention, the amount thereof may be selected appropriately in accordance with factors such as the polymerization degree of the target polymer, the types of monomers, the type of the organolithium compound (B) used, the type of the tertiary organoaluminum compound (A), the type of the Lewis base (C), and the type of the organic solvent. To ensure, for example, that the polymerization will take place smoothly, that the polymer produced may be separated and collected easily, and that the burden of waste treatment may be reduced, it is generally preferable to use an organic solvent in the range of 200 to 3000 parts by weight per 100 parts by weight of the anionically polymerizable monomers that are used.

In the anionic polymerization process of the present invention, the Lewis base (C) and the tertiary organoaluminum compound (A) are preferably brought into contact with each other before contact with the organolithium compound (B). In this manner, high polymerization initiation efficiency may be ensured. The tertiary organoaluminum compound (A) may be added to the polymerization system before a (meth)acrylic acid ester and any other anionically polymerizable monomers are added, or may be added to the polymerization system at the same time as the monomers. In the latter case, the tertiary organoaluminum compound (A) and the monomers may be mixed together beforehand and added in the form of a mixture.

In the anionic polymerization process of the present invention, a copolymer may be obtained by using two or more kinds of (meth)acrylic acid esters, or using one or more kinds of (meth)acrylic acid esters and one or more kinds of other anionically polymerizable monomers. In this case, the copolymer may be produced in a desired form such as random, block or tapered block in a customary manner in usual anionic polymerization, for example, by adding the monomers appropriately (for example, by adding two or more kinds of monomers concurrently or separately with time intervals) or by combining the monomers appropriately. In view of the fact that the anionic polymerization process of the present invention can attain high living properties, the process is particularly suited for the production of block copolymers that requires high blocking efficiency.

In the anionic polymerization process of the present invention, other known additives may be added to the polymerization system as required in accordance with known anionic polymerization techniques. Examples of such additives include inorganic salts such as lithium chloride; metal alkoxide compounds such as lithium methoxyethoxyethoxide and potassium t-butoxide; and organic quaternary salts such as tetraethylammonium chloride and tetraethylphosphonium bromide.

In the anionic polymerization process of the present invention, the polymerization temperature may be selected appropriately in accordance with factors such as the type of the (meth)acrylic acid ester used. In general, the polymerization temperature is preferably in the range of −60° C. to +100° C., and more preferably in the range of −30° C. to +50° C. At an excessively low polymerization temperature, an acrylic acid ester is polymerized to give a highly stereoregular polymer. Thus, when the target polymer is an acrylic acid ester polymer having high flexibility, the polymerization temperature is preferably −50° C. or above. In the anionic polymerization process of the present invention, the cooling conditions on the polymerization system may be mild as compared with the conventional anionic polymerization processes, and high living properties can be achieved even when the polymerization is performed at a temperature closer to room temperature.

The anionic polymerization process of the present invention is preferably carried out in an atmosphere of an inert gas such as nitrogen, argon or helium. In the anionic polymerization process of the present invention, further, polymerization is preferably conducted while performing sufficient stirring so that the polymerization system will become uniform. In the anionic polymerization process of the present invention, the polymerization time may be selected appropriately in accordance with factors such as the molecular weight of the polymer. As compared with the conventional polymerization processes, the process of the present invention allows polymerization to proceed at a high rate. While the amount of polymerization time is variable depending on the polymerization conditions that are adopted, for example, the polymerization of a methacrylic acid ester can be completed within a few minutes, and the polymerization of an acrylic acid ester can be completed within a few tens of seconds. Thus, the anionic polymerization process of the present invention may perform anionic polymerization in a tubular continuous polymerization apparatus that offers high productivity and good cooling efficiency.

In the anionic polymerization process of the present invention, the polymerization reaction may be terminated upon completion of the formation of the target polymer chains, by adding a polymerization terminator to the reaction mixture in accordance with the known anionic polymerization processes. For example, a protonic compound such as methanol, acetic acid, or a methanol solution of hydrochloric acid may be used as the polymerization terminator. The amount in which the polymerization terminator is used may be selected appropriately in accordance with factors such as the amount of the active terminals of the polymer, but is generally preferably in the range of 1 to 100 mol per mol of the organolithium compound (B).

In the anionic polymerization process of the present invention, a terminal functional group-imparting agent (such as, for example, aldehyde, lactone or carbon dioxide) may be added to the reaction system after the scheduled polymerization has been completed and before the polymerization terminator is added. In this case, the polymer that is obtained has a functional group such as a hydroxyl group or a carboxyl group at an end of the molecular chain. The polymer separated and collected from the reaction mixture after the termination of the polymerization contains residual metal components derived from the organolithium compound (B) or the tertiary organoaluminum compound (A) used in the polymerization. Such residual metal components sometimes cause deterioration in properties such as transparency of the polymer and materials containing the polymer. Thus, the polymer for some specific use application is preferably cleaned after the completion of the polymerization to remove the metal compounds derived from the organolithium compound (B) and the tertiary organoaluminum compound (A). The metal compounds may be effectively removed by subjecting the polymer to a purification treatment such as a washing treatment using an acidic aqueous solution or an adsorption treatment using an adsorbent such as an ion exchange resin. Examples of the acidic aqueous solutions used here include hydrochloric acid, aqueous sulfuric acid solution, aqueous nitric acid solution, aqueous acetic acid solution, aqueous propionic acid solution and aqueous citric acid solution.

The polymer may be separated and collected from the reaction mixture after the termination of the polymerization in any manner without limitation in accordance with known procedures. For example, the polymer may be separated and collected by pouring the reaction mixture into a poor solvent for the polymer to precipitate the polymer, or by distilling off the solvent from the reaction mixture to collect the polymer.

Further, a polymer with a desired molecular weight may be produced according to the present invention. The molecular weights of polymers that may be produced range widely. From points of view such as the handleability, fluidity and mechanical properties of a polymer that is obtained, however, it is generally preferable that the number average molecular weight be in the range of 1000 to 1000000. Further, according to the present invention, a polymer having a highly uniform molecular weight (that is, a narrow molecular weight distribution) may be usually obtained, and it is possible to produce a polymer having a molecular weight distribution (Mw/Mn) of 1.5 or less. Incidentally, a polymer having a wide molecular weight distribution may be purposefully obtained by controlling, for example, the rate of addition of the anionically polymerizable monomers to the polymerization system, or the rate of diffusion of the monomers in the polymerization system. Further, according to the present invention, the tertiary organoaluminum compound (A) satisfies the specified molar ratio of the tertiary organoaluminum compound (A2) to the tertiary organoaluminum compound (A1). Consequently, the tertiary organoaluminum compound (A) is unlikely to generate a gel, and thus the deterioration in polymer characteristics caused by such a gel may be prevented.

EXAMPLES

Hereinbelow, the present invention will be described in detail based on Examples. However, it should be construed that the scope of the present invention is not limited thereto.

Properties in Examples and Comparative Examples were measured or evaluated by the following methods. Further, chemicals used in Examples and other experiments described below were dried and purified by conventional methods and were deaerated with nitrogen before use. The chemicals were transferred and supplied in nitrogen atmosphere.

"Weight average molecular weight (Mw), number average molecular weight (Mn) and molecular weight distribution (Mw/Mn)"

The weight average molecular weight, number average molecular weight, and molecular weight distribution of block copolymers obtained in Examples and Comparative Examples described later were measured by gel permeation chromatography (hereinafter, abbreviated as GPC) relative to polystyrenes. The details are as follows. Device: GPC device "HLC-8020" manufactured by TOSOH CORPORATION. Separation columns: "TSKgel GMHXL", "G4000HXL" and "G5000HXL" manufactured by TOSOH CORPORATION were connected in series. Eluent: Tetrahydrofuran. Eluent flow rate: 1.0 mL/min. Column temperature: 40° C. Detection method: Differential refractive index (RI).

"Molar Ratio (A2)/(A1)"

The molar ratio of diisobutyl(2,6-di-t-butyl-4-methylphenoxy)aluminum (A2) to isobutylbis(2,6-di-t-butyl-4-methylphenoxy)aluminum (A1) present in the tertiary organoaluminum compounds (A) obtained in Reference Examples described later was determined by $^1$H-NMR measurement.

($^1$H-NMR Measurement Conditions)

Device: Nuclear magnetic resonance device "JNM-ECX400" manufactured by JEOL Ltd.
Temperature: 25° C.
Solvent: Deuterated toluene (Calculation of molar ratio)

In $^1$H-NMR measurement, signals at near 1.45 ppm and 1.55 ppm were assigned to the t-butyl group (—C—(CH$_3$)$_3$) in diisobutyl(2,6-di-t-butyl-4-methylphenoxy)aluminum (A2) and to the t-butyl group (—C—(CH$_3$)$_3$) in isobutylbis(2,6-di-t-butyl-4-methylphenoxy)aluminum (A1), respectively. The molar ratio (A2)/(A1) was calculated from the integral ratio of the signals.

"Uniformity in Molecular Weight"

The molecular weight distribution of block copolymers obtained in Examples and Comparative Examples described later was measured. The molecular weight was evaluated as highly uniform "○" when the molecular weight distribution was 1.5 or less and as poorly uniform "x" when the molecular weight distribution was more than 1.5.

"Presence or Absence of Gel"

The presence or absence of a gel in the first-stage polymerization of Examples and Comparative Examples described later was determined by visually checking the inner wall of a three-necked flask used in the test after the first-stage polymerization. When there was no attachment of a gel, the polymerization was evaluated as free from gelation "○". When a gel had been attached, the polymerization was evaluated as having been accompanied by gelation "x".

"Polymerization Initiation Efficiency"

The polymerization initiation efficiency (F1) in the first-stage polymerization was calculated from the following equation wherein Mn (R1) is the Mn of the polymer obtained in the first-stage polymerization, and Mn (I1) is the Mn of the polymer calculated assuming that the polymerization initiation efficiency in the first-stage polymerization is 100%.

F1=Mn(I1)/Mn(R1)

Preparation of Tertiary Organoaluminum Compound (A): isobutylbis(2,6-di-t-butyl-4-methylphenoxy)aluminum Reference Example 1

34 mL of dry toluene obtained by drying with sodium and distillation in an argon atmosphere, and 8.21 g of 2,6-di-t-butyl-4-methylphenol were added to a 200 mL volume flask purged with argon. The mixture was stirred at room temperature to give a solution. 6.19 mL of a 20 wt % toluene solution of triisobutylaluminum was added to the solution obtained, and the mixture was stirred at 110° C. for 28 hours to give a toluene solution containing a tertiary organoaluminum compound (A) at a concentration of 0.46 mol/L.

A portion of the tertiary organoaluminum compound (A) obtained was sampled and analyzed by $^1$H-NMR. The molar ratio of diisobutyl(2,6-di-t-butyl-4-methylphenoxy)aluminum (A2) to isobutylbis(2,6-di-t-butyl-4-methylphenoxy)aluminum (A1) was 0.00438%. Further, it was shown that the toluene solution of the tertiary organoaluminum compound (A) had excellent storage stability at low temperatures.

Reference Example 2

A tertiary organoaluminum compound (A) was prepared in the same manner as in Reference Example 1, except that the stirring time was changed to 25.5 hours. A portion of the tertiary organoaluminum compound (A) obtained was sampled and analyzed by $^1$H-NMR. The molar ratio (A2)/(A1) was 0.307%. Further, it was shown that the toluene solution of the tertiary organoaluminum compound (A) had excellent storage stability at low temperatures.

Reference Example 3

A tertiary organoaluminum compound (A) was prepared in the same manner as in Reference Example 1, except that the stirring time was changed to 23.7 hours. A portion of the tertiary organoaluminum compound (A) obtained was sampled and analyzed by $^1$H-NMR. The molar ratio (A2)/(A1) was 0.505%. Further, it was shown that the toluene solution of the tertiary organoaluminum compound (A) had excellent storage stability at low temperatures.

Reference Example 4

A tertiary organoaluminum compound (A) was prepared in the same manner as in Reference Example 1, except that the stirring time was changed to 21.7 hours. A portion of the tertiary organoaluminum compound (A) obtained was sampled and analyzed by $^1$H-NMR. The molar ratio (A2)/(A1) was 0.731%. Further, it was shown that the toluene solution of the tertiary organoaluminum compound (A) had excellent storage stability at low temperatures.

Reference Example 5

A tertiary organoaluminum compound (A) was prepared in the same manner as in Reference Example 1, except that the stirring time was changed to 19.6 hours. A portion of the tertiary organoaluminum compound (A) obtained was sampled and analyzed by $^1$H-NMR. The molar ratio (A2)/(A1) was 0.999%.

Reference Example 6

A tertiary organoaluminum compound (A) was prepared in the same manner as in Reference Example 1, except that the stirring time was changed to 17.5 hours. A portion of the tertiary organoaluminum compound (A) obtained was sampled and analyzed by $^1$H-NMR. The molar ratio (A2)/(A1) was 1.28%.

TABLE 1

|  | Stirring time [h] | Organoaluminum compound [mmol/kg] | | (A2)/(A1) [%] |
|---|---|---|---|---|
|  |  | IBT (A1) | DIBA (A2) |  |
| Ref. Ex. 1 | 28 | 67.6 | 0.00296 | 0.00438 |
| Ref. Ex. 2 | 25.5 | 77.1 | 0.237 | 0.307 |
| Ref. Ex. 3 | 23.7 | 67.1 | 0.339 | 0.505 |
| Ref. Ex. 4 | 21.7 | 77.0 | 0.563 | 0.731 |
| Ref. Ex. 5 | 19.6 | 67.5 | 0.674 | 0.999 |
| Ref. Ex. 6 | 17.5 | 76.0 | 0.969 | 1.28 |

The abbreviations in Table 1 mean the following.
IBT: Isobutylbis(2,6-di-t-butyl-4-methylphenoxy)aluminum
DIBA: Diisobutyl(2,6-di-t-butyl-4-methylphenoxy)aluminum Example 1

(1) A 100 mL volume, three-necked flask was fitted with a semicircular stirring rod, and the system was purged with nitrogen. There were added 28.3 g of toluene, 0.35 g of 1,1,4,7,10,10-hexamethyltriethylenetetramine, and 6.5 mL of the 0.46 mmol/L toluene solution of the tertiary organoaluminum compound (A) prepared in Reference Example 1. The mixture was cooled to 20° C. using a water bath. Further, 1.12 mL of a cyclohexane solution containing 1.30 mmol of sec-butyllithium was added, and the mixture was stirred for 20 minutes. At this time, the concentrations of 1,1,4,7,10,10-hexamethyltriethylenetetramine and sec-butyllithium were 32.9 mmol/kg and 34.1 mmol/kg, respectively. While vigorously stirring the solution, 8.9 g of methyl methacrylate was added dropwise thereto over a period of about 2 minutes at 20° C. The solution was initially colored yellow and the color faded in 1 minute after the completion of the dropwise addition.

(2) A portion of the solution obtained in (1) was sampled and was poured into a large amount of methanol to precipitate a white deposit (PMMA), which was then recovered and dissolved into tetrahydrofuran. The polymer (PMMA) obtained in the first-stage polymerization was analyzed by GPC and was found to have Mw of 7370 and Mw/Mn of 1.16. The polymerization initiation efficiency was 0.96.

(3) Another 100 mL volume, three-necked flask was fitted with a semicircular stirring rod, and the system was purged with nitrogen. After 40.8 g of toluene was added, 4.6 g of the solution obtained in (1) was added. The mixture was cooled using a −22° C. methanol bath. When the internal temperature reached −19° C., 6.72 mL of n-butyl acrylate as the second monomer was added dropwise over a period of 13 minutes and was thereby polymerized.

(4) A portion of the solution obtained in (3) was sampled and was poured into a large amount of methanol to precipitate a white deposit (PMMA-b-PnBA), which was then recovered and dissolved into tetrahydrofuran. The solution was analyzed by GPC. The block copolymer obtained (PMMA-b-PnBA) showed a monomodal peak, and had Mw of 62700 and Mw/Mn of 1.23. The polymerization conditions and the polymerization results are described in Table 2 later.

Examples 2 to 4, and Comparative Examples 1 and 2

Polymerization was performed and terminated in the same manner as in Example 1, except that the tertiary organoaluminum compound (A) prepared in Reference Example 1 was replaced by any of the tertiary organoaluminum compounds (A) prepared in Reference Examples 2 to 6. The polymerization conditions and the polymerization results are described in Table 2 later.

Comparative Example 3

Polymerization was performed and terminated in the same manner as in Example 1, except that 1,1,4,7,10,10-hexamethyltriethylenetetramine was not used. The polymerization conditions and the polymerization results are described in Table 2 below.

TABLE 2

|  | Polymerization conditions | | | Polymerization results | | | | | | |
|---|---|---|---|---|---|---|---|---|---|---|
|  | | | | First-stage polymerization (MMA) | | | | Second-stage polymerization (nBA) | | |
|  | Initiator (sBL) [mmol/kg] | Lewis base (HMTETA) [mmol/kg] | (A2)/(A1) [%] | Mw | Mw/Mn | Polymerization initiation efficiency | Presence or absence of gel | Mw | Mw/Mn | Uniformity in molecular weight |
| Ex. 1 | 32.9 | 34.1 | 0.00438 | 7370 | 1.16 | 0.96 | ○ | 62700 | 1.23 | ○ |
| Ex. 2 | 33.2 | 34.9 | 0.307 | 7820 | 1.13 | 0.87 | ○ | 63500 | 1.20 | ○ |
| Ex. 3 | 32.9 | 34.1 | 0.505 | 7080 | 1.14 | 0.98 | ○ | 61800 | 1.22 | ○ |
| Ex. 4 | 33.1 | 34.7 | 0.731 | 7920 | 1.15 | 0.85 | ○ | 69300 | 1.31 | ○ |
| Comp. Ex. 1 | 32.9 | 34.0 | 0.999 | 7440 | 1.15 | 0.94 | x | 77700 | 1.53 | x |
| Comp. Ex. 2 | 33.0 | 35.0 | 1.28 | 7900 | 1.16 | 0.84 | x | 91100 | 1.78 | x |
| Comp. Ex. 3 | 32.9 | — | 0.00438 | Not polymerized | | | — | Not polymerized | | — |

The abbreviations in Table 2 mean the following.
sBL: sec-Butyllithium
HMTETA: 1,1,4,7,10,10-Hexamethyltriethylenetetramine
MMA: Methyl methacrylate
nBA: n-Butyl acrylate The results described in Table 2 showed that Examples 1 to 4 in accordance with the present invention successfully produced PMMA-b-PnBA diblock copolymers having a narrow molecular weight distribution (Mw/Mn=1.20 to 1.31) without the occurrence of a gel.

minum compound (A) prepared in Reference Example 3 was replaced by the tertiary organoaluminum compound (A) prepared in Reference Example 5. The polymerization conditions and the polymerization results are described in Table 3 below.

TABLE 3

|  | Polymerization conditions | | | | Polymerization results | | | | | | |
|---|---|---|---|---|---|---|---|---|---|---|---|
|  |  |  |  |  | First-stage polymerization (MMA) | | | | Second-stage polymerization (nBA) | | |
|  | Initiator (sBL) | Lewis base | | (A2)/(A1) |  |  | Polymerization initiation efficiency | Presence or absence of gel |  |  | Uniformity in molecular weight |
|  | [mmol/kg] | Type | [mmol/kg] | [%] | Mw | Mw/Mn |  |  | Mw | Mw/Mn |  |
| Ex. 5 | 32.9 | PMDETA | 34.0 | 0.505 | 9020 | 1.25 | 0.82 | ○ | 71000 | 1.27 | ○ |
| Comp. Ex. 4 | 33.0 | PMDETA | 34.1 | 0.999 | 9300 | 1.22 | 0.78 | x | 79500 | 1.56 | x |
| Ex. 6 | 32.9 | DME | 138 | 0.505 | 6850 | 1.10 | 0.94 | ○ | 61800 | 1.23 | ○ |
| Comp. Ex. 5 | 32.9 | DME | 138 | 0.999 | 7120 | 1.12 | 0.92 | x | 81000 | 1.61 | x |
| Ex. 7 | 32.9 | Et$_2$O | 171 | 0.505 | 10500 | 1.22 | 0.71 | ○ | 73600 | 1.31 | ○ |
| Comp. Ex. 6 | 32.8 | Et$_2$O | 170 | 0.999 | 9680 | 1.20 | 0.74 | x | 94100 | 1.70 | x |

Comparative Examples 1 and 2 showed that when the molar ratio (A2)/(A1) exceeded 0.8%, PMMA-b-PnBA diblock copolymers had a wide molecular weight distribution of more than 1.5. Further, Comparative Example 3 showed that PMMA was not formed when the polymerization omitted the use of 1,1,4,7,10,10-hexamethyltriethylenetetramine.

Examples 5 to 7

Polymerization was performed and terminated in the same manner as in Example 3, except that 1,1,4,7,10,10-hexamethyltriethylenetetramine was replaced by N,N,N',N'',N''-pentamethyldiethylenetriamine, 1,2-dimethoxyethane or diethyl ether. The polymerization conditions and the polymerization results are described in Table 3 later.

Comparative Example 4

Polymerization was performed and terminated in the same manner as in Example 5, except that the tertiary organoaluminum compound (A) prepared in Reference Example 3 was replaced by the tertiary organoaluminum compound (A) prepared in Reference Example 5. The polymerization conditions and the polymerization results are described in Table 3 later.

Comparative Example 5

Polymerization was performed and terminated in the same manner as in Example 6, except that the tertiary organoaluminum compound (A) prepared in Reference Example 3 was replaced by the tertiary organoaluminum compound (A) prepared in Reference Example 5. The polymerization conditions and the polymerization results are described in Table 3 later.

Comparative Example 6

Polymerization was performed and terminated in the same manner as in Example 7, except that the tertiary organoaluminum compound (A) prepared in Reference Example 3 was replaced by the tertiary organoaluminum compound (A) prepared in Reference Example 5. The polymerization conditions and the polymerization results are described in Table 3 below.

The abbreviations in Table 3 mean the following.
sBL: sec-Butyllithium
PMDETA: N,N,N',N'',N''-Pentamethyldiethylenetriamine
DME: 1,2-Dimethoxyethane
Et$_2$O: Diethyl ether
MMA: Methyl methacrylate
nBA: n-Butyl acrylate The results described in Table 3 showed that Examples 5 to 7 in accordance with the present invention successfully produced PMMA-b-PnBA diblock copolymers having a narrow molecular weight distribution (Mw/Mn=1.23 to 1.31) even when the Lewis base (C) was changed from 1,1,4,7,10,10-hexamethyltriethylenetetramine to N,N,N',N'',N''-pentamethyldiethylenetriamine, 1,2-dimethoxyethane or diethyl ether.

Comparative Examples 4 to 6 afforded PMMA-b-PnBA diblock copolymers, but the molecular weight distributions thereof were larger than 1.5.

INDUSTRIAL APPLICABILITY

The present invention, which pertains to a process for anionically polymerizing an anionically polymerizable monomer and to a method for producing a polymer by the polymerization process, is useful in industry because it provides a more reliable process for anionically polymerizing a (meth)acrylic acid ester that attains high living properties without impairing the inherent characteristics of (meth)acrylic polymers such as transparency, and also allows for more reliable production of a (meth)acrylic acid ester block polymer having a highly uniform molecular weight.

The invention claimed is:
1. A process, comprising:
  anionically polymerizing a (meth)acrylic acid ester in the presence of a tertiary organoaluminum compound (A), 1-methylpropyllithium, and a Lewis base in a polymerization system, to produce a polymer,
  wherein the tertiary organoaluminum compound (A) comprises isobutylbis(2,6-di-t-butyl-4-methylphe- noxy)aluminum (A1) and diisobutyl(2,6-di-t-butyl-4-methylphenoxy)aluminum (A2), and wherein an (A2)/(A1) molar ratio of the tertiary organoaluminum compound (A), based on moles of isobutylbis(2,6-di-t-butyl-4-methylphenoxy)aluminum (A1) and moles of diisobutyl(2,6-di-t-butyl-4-methylphenoxy)aluminum (A2) is in a range of from more than 0 to 0.8%.

2. The process of claim 1, wherein the (A2)/(A1) molar ratio is in a range of from 0.001 to 0.8%.

3. The process of claim 1, wherein the Lewis base comprises a tertiary polyamine compound.

4. The process of claim 3, wherein the tertiary polyamine compound comprises N,N,N',N'-tetramethylethylenediamine, N,N,N',N'',N''-pentamethyldiethylenetriamine, and/or 1,1,4,7,10,10-hexamethyltriethylenetetramine.

5. The process of claim 1, wherein the Lewis base comprises an ether compound.

6. The process of claim 5, wherein the ether compound comprises an acyclic ether compound having one or more ether bonds in a molecule thereof or a cyclic ether compound having two or more ether bonds in the molecule.

7. The process of claim 1, wherein the Lewis base comprises N,N,N',N'-tetramethylethylenediamine.

8. The process of claim 1, wherein the Lewis base comprises N,N,N',N'',N''-pentamethyldiethylenetriamine.

9. The process of claim 1, wherein the Lewis base comprises 1,1,4,7,10,10-hexamethyltriethylenetetramine.

10. The process of claim 1, wherein the (A2)/(A1) molar ratio is in a range of from 0.001 to 0.5%.

11. The process of claim 1, wherein the (A2)/(A1) molar ratio is in a range of from 0.001 to 0.3%.

12. The process of claim 1, wherein the (A2)/(A1) molar ratio is in a range of from 0.00438 to 0.505%.

13. The process of claim 1, wherein the (A2)/(A1) molar ratio is in a range of from 0.00438 to 0.307%.

14. The process of claim 1, wherein no gel forms in the anionically polymerizing.

15. The process of claim 1, wherein the anionically polymerizing is performed twice to produce a diblock copolymer.

16. The process of claim 15, wherein the diblock copolymer has a polydispersity index in a range of from 1.20 to 1.31.

17. The process of claim 1, which has a polymerization initiation efficiency in a range of from 0.85 to 0.98.

18. The process of claim 1, wherein the (A2)/(A1) molar ratio is in a range of from 0.00438 to 0.731%.

19. A method for producing a polymer, the method comprising:
polymerizing a (meth)acrylic acid ester by the process of claim 1.

20. A method for producing a block copolymer, the method comprising:
polymerizing two or more kinds of (meth)acrylic acid esters by the process of claim 1.

* * * * *